United States Patent [19]
Melen et al.

[11] Patent Number: 5,752,079
[45] Date of Patent: May 12, 1998

[54] SYSTEM FOR READING PARAMETERS FROM PORTABLE KEY MODULE AND TRANSFERRING THESE PARAMETERS TO CONTROLLER TO EFFECT DISTRIBUTION AND STORAGE OF ELECTRONIC DOCUMENT DATA THROUGHOUT NETWORK

[75] Inventors: Roger D. Melen, Los Altos Hills; Boris Krtolica, Milpitas, both of Calif.

[73] Assignee: Canon Kabushiki Kaisha, Tokyo, Japan

[21] Appl. No.: 524,996

[22] Filed: Sep. 8, 1995

[51] Int. Cl.⁶ .................................................. G06F 13/00
[52] U.S. Cl. ............................. 395/827; 395/200.68
[58] Field of Search ................................ 235/492, 381, 235/375, 383; 340/825.34; 380/23, 20; 358/442; 395/200, 600, 827, 200.68

[56] References Cited

U.S. PATENT DOCUMENTS

| | | | |
|---|---|---|---|
| 4,874,935 | 10/1989 | Younger | 235/492 |
| 4,900,904 | 2/1990 | Wright et al. | 235/381 |
| 4,982,069 | 1/1991 | Kayanakis | 235/375 |
| 5,157,726 | 10/1992 | Merkle et al. | 380/23 |
| 5,159,182 | 10/1992 | Eisele | 235/492 |
| 5,204,663 | 4/1993 | Lee | 340/825.34 |
| 5,303,067 | 4/1994 | Kang et al. | 358/442 |
| 5,321,814 | 6/1994 | Barajas et al. | 395/200 |
| 5,380,991 | 1/1995 | Valencia et al. | 235/383 |
| 5,557,677 | 9/1996 | Prytz | 380/20 |
| 5,566,327 | 10/1996 | Sehr | 395/600 |

Primary Examiner—Thomas C. Lee
Assistant Examiner—David Ton
Attorney, Agent, or Firm—Paul Hentzel

[57] ABSTRACT

Document entry system 10 receives user documents 10D containing document data for distribution and storage throughout a user network 10N. Controller 10C controls the operation of the document entry system. Document scanner 10S has a document port 10p for receiving the user documents to be entered by the user. The document scanner is responsive to the controller for scanning the document data on the documents, and providing electronic document data for distribution and storage throughout the user network. Controller display 12 is responsive to the controller for displaying operational information about the document entry system to the user. Portable key module 14 contains user module data which defines distribution parameters and storage parameters for the electronic document data. Key module reader 15 has a module port for reading the module data on the key module and transferring the module data to the controller to effect the distribution and storage of the electronic document data. User response device 16 is connected to the controller for permitting the user to initiate operation of the document entry system in response to the module data. In addition, the user response key may initiate the distribution and storage of the electronic document data parameters throughout the user network.

37 Claims, 4 Drawing Sheets

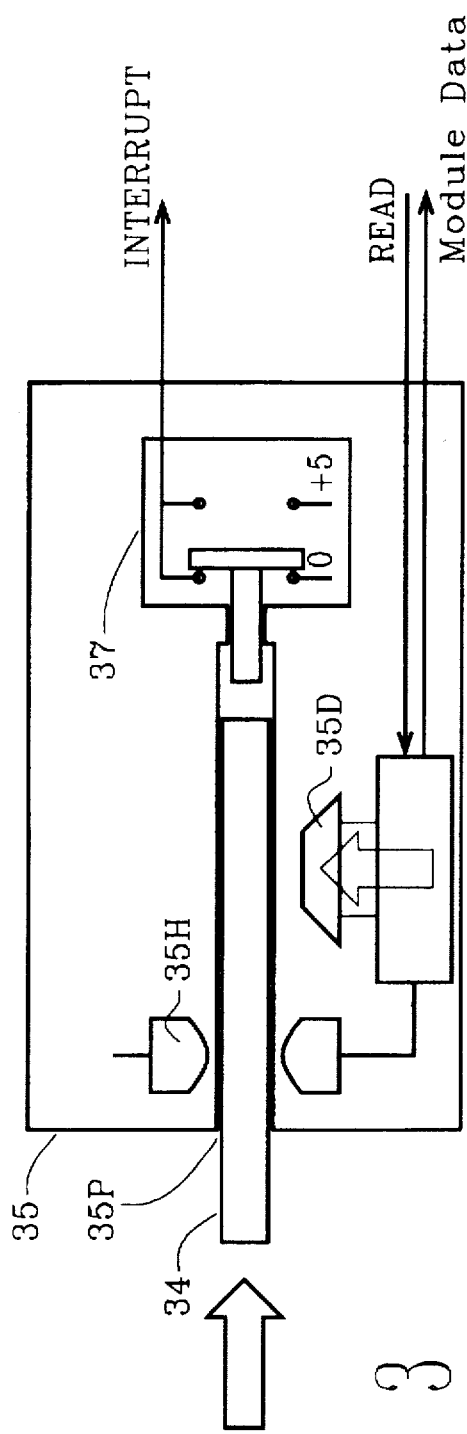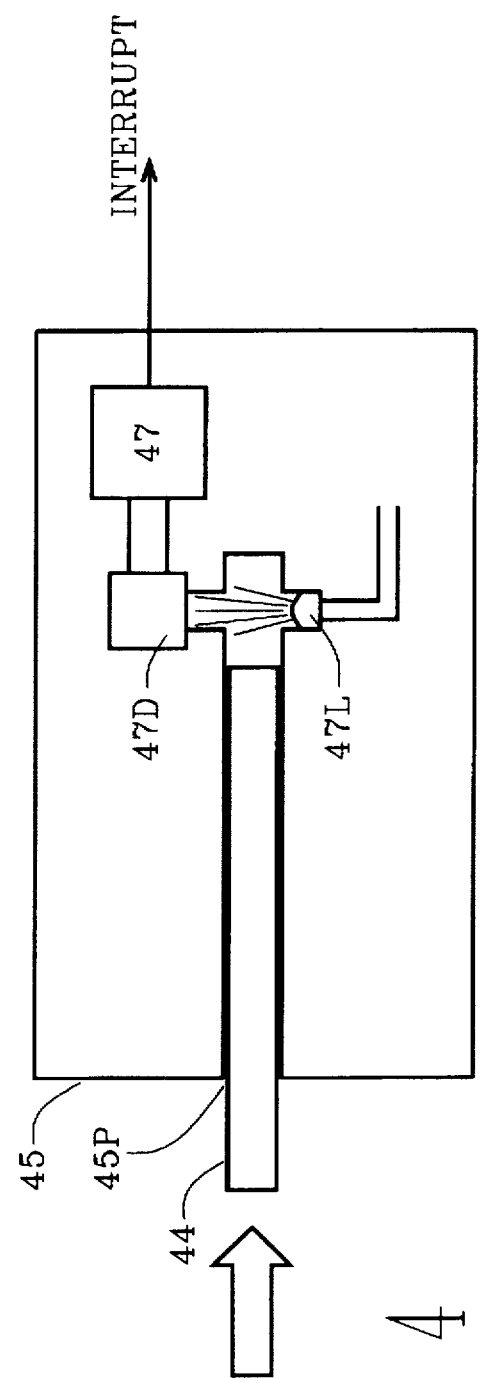

Providing Portable Key Module

Engaging Key Module
with Document Entry System

Initiating Operation
of Document Entry System

Directing Operation
of Document Entry System

Transferring Module Data
to Document Entry System

Receiving User Documents

Scanning Document Data

Initiating Distribution

Distributing Electronic Data

Storing Electronic Data

Disengaging Key Module
from Document Entry System

Fig 5

SYSTEM FOR READING PARAMETERS FROM PORTABLE KEY MODULE AND TRANSFERRING THESE PARAMETERS TO CONTROLLER TO EFFECT DISTRIBUTION AND STORAGE OF ELECTRONIC DOCUMENT DATA THROUGHOUT NETWORK

TECHNICAL FIELD

This invention relates to entering documents into a system for scanning, distribution, and storage throughout a network, and more particularly to such a system with a key module interface.

BACKGROUND

Currently users must place documents to be scanned into an entry tray of the document entry station, and manually enter an identification password into a keypad control panel. The user must then interface with a multi-level selection menu to select a particular operation, document destination, and storage attributes. This menu interface typically requires additional information such as telephone numbers for facsimile distribution and pathnames (or folder names) for storage distribution. The user must make these additional entries through the control panel which takes time and requires concentration. Errors made by users unfamiliar with the selection menu or the distribution information or the control panel may cause additional delays. Meanwhile a queue of waiting users collects behind the slow user.

Automatic teller machines (ATMS) and other financial transaction stations employ a card identification device for authorizing access to the users account information in order to make deposits and withdrawals. However, the ATM does not perform any transaction tasks upon receipt of the user ID card, except identify the owner of the card and instruct the user to enter a five digit secret code number as further identification. That is, the ATM card does not enable the ATM to perform the transaction automatically. Further, the ATM does not scan documents nor distribute data for storage throughout a user network.

SUMMARY

It is therefore an object of this invention to provide a document entry system with a key module interface and method of operation.

It is another object of this invention to provide such a key module interface and method of operation which requires minimal user time, training, and concentration.

It is a further object of this invention to provide such a key module interface which is self-directed by the module data contained on the key module.

It is a further object of this invention to provide such a key module interface which employs user menus.

Briefly, these and other objects of the present invention are accomplished by providing a document entry station for receiving user documents containing document data and for distributing and storing the data throughout a user network. A controller is responsive to the user for controlling the operation of the document entry station. A document scanner has a document port for receiving the user documents. The scanner scans the document data thereon to provide electronic document data for distribution and storage. A controller display presents the operational status of the document entry station and operating instructions for the document entry station to the user. A portable key module contains user module data having a parameter part and a program part. The parameter part defines distribution parameters and storage parameters for the electronic document data. The program part enables user operation of the document entry station. A key module reader reads the module data on the key module and transfers the module data to the controller. The module data then directs the controller to permit user operation of the document entry station. A user response device permits the user to make user entries to the controller during user operation of the document entry station.

BRIEF DESCRIPTION OF THE DRAWING

Further objects and advantages of the present document entry system and the operation of key module will become apparent from the following detailed description and drawing (not drawn to scale) in which:

FIG. 3 is a sectional view of the key module detector of FIG. 2A employing an electric detection switch;

FIG. 4 is a sectional view of the key module detector of FIG. 2A employing an optical detection switch; and FIG. 5 is a flow chart of the method of operation of the document entry system.

Figures 1A, 1B:
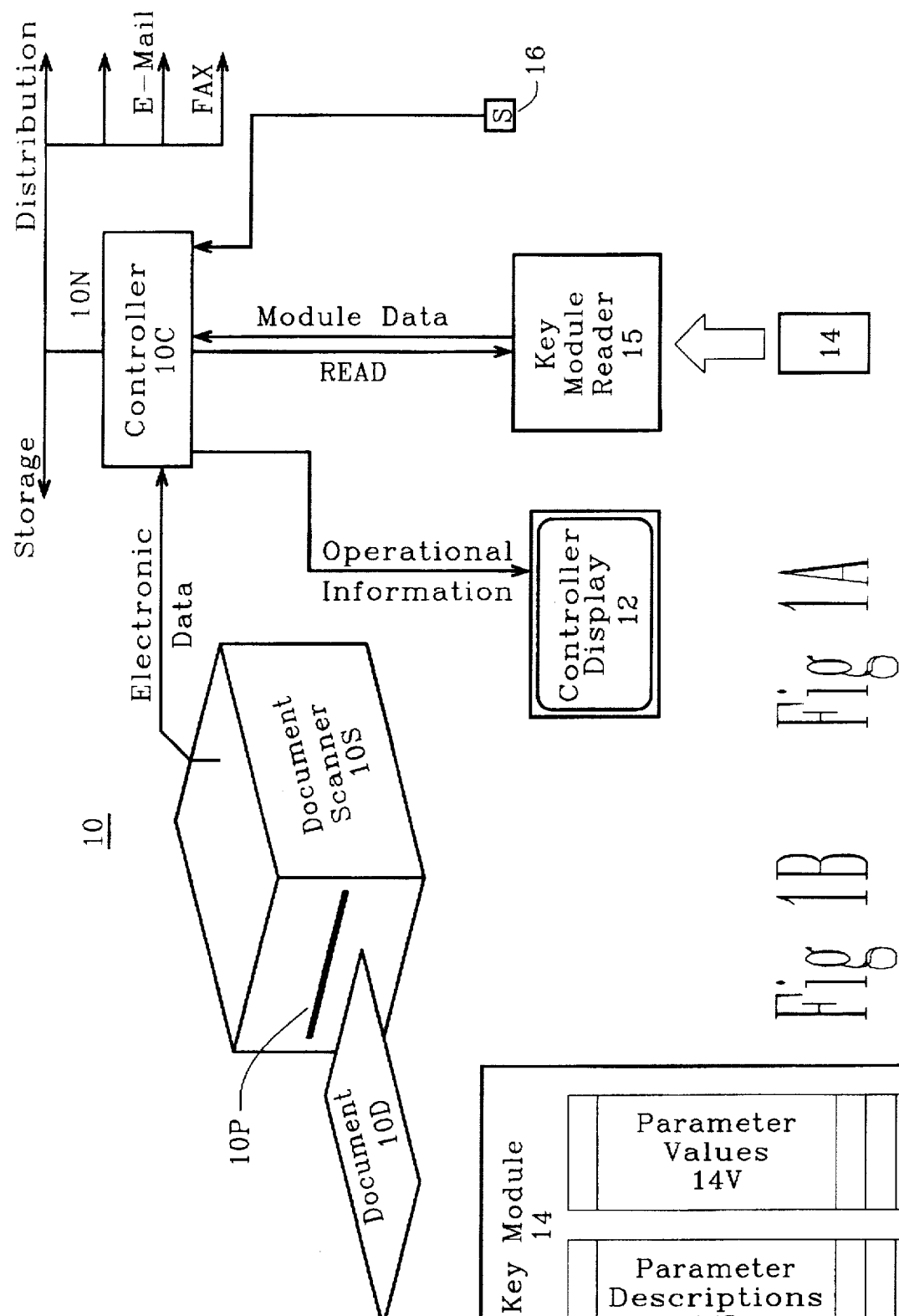
FIG. 1A is a block diagram of a general embodiment of the document entry system and the key module.
FIG. 1B is a schematic representation of the memory contents of the key module of the system of FIG. 1A.

The elements of the invention are designated by two digit reference numerals in the above figures. The first digit indicates the figure in which that element is first disclosed or is primarily described. The second digit indicates like features and structures throughout the figures. Some reference numerals are followed by a letter which indicates a sub-portion or related feature of that element.

GENERAL SYSTEM (FIGS. 1A and 1B)

Document entry system 10 receives user documents 10D containing document data for distribution and storage throughout a user network 10N. Controller 10C controls the operation of the document entry system. Document scanner 10S has a document port 10P for receiving the user documents to be entered by the user. The document scanner is responsive to the controller for scanning the document data on the documents, and providing electronic document data for distribution and storage throughout the user network.

The user network may be any suitable collection of computer stations such as a local area network (LAN) or a wide area network (WAN). The data transmission device of the network may have any suitable electronic format such as facsimile (fax), electronic mail (E-mail), file transfer, remote access, etc. Controller display 12 is responsive to the controller for displaying operational information about the document entry system to the user.

Portable key module 14 contains user module data which defines distribution parameters and storage parameters for the electronic document data. The module data stored on key module 14 has a description section 14D and a value section 14V (see FIG. 1B). The description section defines the nature of distribution and storage task to be accomplished by the document entry system (such as distribution of files and storage in archival memory), or the type of data within the key module (such as user identification data). The value section defines the particulars of the distribution parameters and storage parameters, such as memory addresses, file pathnames, network addresses, distribution telephone numbers, folder names, number of documents, database name, or user ID data. Key module reader 15 has a module port for reading the module data on the key module and transferring the module data to the controller to effect the distribution and storage of the electronic document data.

User response device 16 is connected to the controller for permitting the user to initiate operation of the document entry system in response to the module data. The user response device may be a single user key for initiating the transfer of the module data to the controller. In addition, the user response key may initiate the distribution and storage of the electronic document data parameters throughout the user network.

Figure 2A:
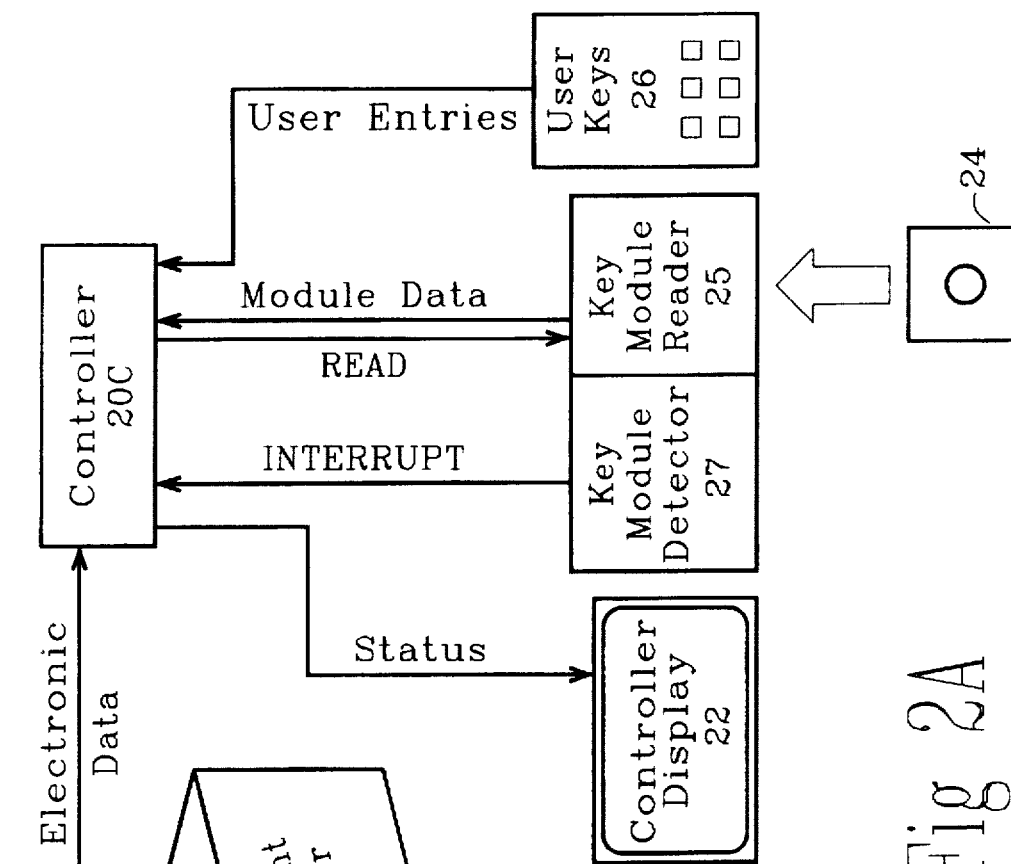
FIG. 2A is a block diagram of a self-directed embodiment of the document entry station and the key module.
Figure 2B:
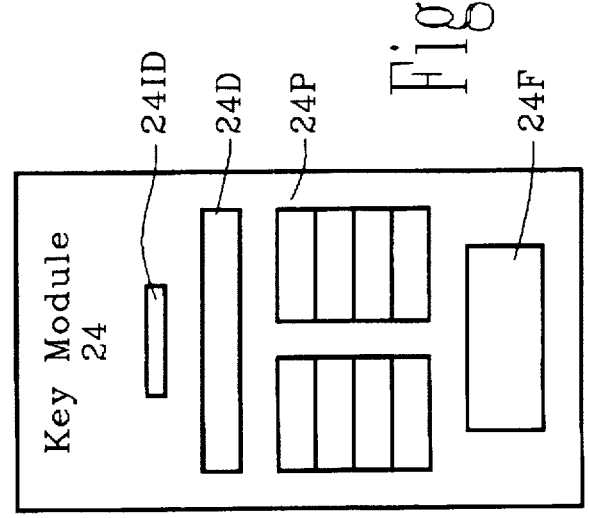
FIG. 2B is a schematic representation of the memory contents of the key module of the station of FIG. 2A.

SELF-DIRECTED STATION (FIGS. 2A and 2B)

Self-directed document entry station 20 receives user documents 20D containing document data for distributing and storing the document data throughout a user network. Controller 20C is responsive to the user for controlling the normal operation of the document entry station. Document scanner 20S has a document port 20P for receiving the user documents, and is responsive to the controller for scanning the document data thereon to provide electronic document data for distribution and storage throughout the user network.

Controller display 22 is responsive to the controller, and may be a suitable graphic or alpha-numeric imaging device for displaying the operational status of the document entry station to the user and for displaying system information and user instructions from the document entry station to the user. The operational status displayed may include system busy, system ready, or system in standby. The system information may include items such as the amount of free memory space, the number of documents under processing, the number of active users, and the number of print jobs waiting. The user instructions may include insert documents to be scanned, enter required pathnames, enter required telephone numbers, and user elections.

Portable key module 24 contains user module data having a parameter part 24P, a program part 24D, a file part 24F, and an identification part 24ID (as schematically shown in FIG. 2B). The parameter part 24P of the module data defines distribution parameters and storage parameters for the electronic document data. The program part 24D enables user operation of the document entry station for receiving and scanning the user documents and for distributing and storing the electronic document data. The file part 24F contains user files to be distributed and stored throughout the user network. The identification part 24ID contains user identification data for identifying the user as the key module reader 25 reads and transfers the module data to the controller. The module data contained in the key module may be stored in any suitable memory medium such as a magnetic strip, an optical memory, or a magnetic disk memory.

Key module reader 25 reads the module data on the key module and transfers the module data to the controller which configures the controller to permit user operation of the document entry station. User response device 26 may be a suitable alpha-numeric key panel, a touch panel or track ball, for permitting the user to make user entries to the controller during user operation of the document entry station. A key module detector detects the presence of the key module, and for signaling the presence of the key module to the controller.

Each user may carry a small portable key module database such as a 3.5" disk which is inserted into a module port. The key module database transfers the user's ID data to the document entry station. The user ID data may include related administrative information such as accounting, billing matters, and security clearance. Physical possession of a key module provides the first line of security against unauthorized access into the document entry station. In addition, the traditional password/keypad logic security may also be employed. Further, the key module may display the employee's identification (with security photo) on the cover for general security measures.

The program part of the module data from the key module may be self-directing for automatically operating the document entry station after the reader has transferred the module data to the controller. The program part may be self-terminating for automatically terminating the program at the end of the self-directed operation. In addition, the program part may be self-ejecting for automatically ejecting the key module from the key module detector after termination by the module data. The program part may include user macro programs which simulate user entries for automatically operating the document entry station. The parameter part of the module data may include user menus for assisting the user in operation of the document entry station.

The key module transfers the user's personal document entry interface program into the station which reprograms the control panel to suit the user's needs and experience. The regular controller program becomes a default program for non-key users, or users without a personal program. The personal menu displayed on the panel monitor is the user's own customized menu tailored to fit the user's most frequent operations. The menu selections are conveniently labeled with the user's own words and icons. Presenting the user with a user friendly, well known selection menu, promotes interface efficiency and saves time in the document entry user queue.

The document entry system may be self-functioning by the insertion of the key module. The document entry system is programmed to immediately access any key module insertions and search for an operation execute file containing all of steps of the user's mission (or missions). The 3.5" disk key module is compatible with work station PCs. The user may setup a key module operation file with "canned" instructions in advance at his work station. The user's work station is generally a more comfortable and productive environment than the document entry user queue. The user is sitting (not standing) with all reference material close at hand, without a backed-up user queue or other performance pressure.

Untrained personnel may pick-up a key module with canned instructions from a highly trained work station employee, carry the key module to the nearest document entry station, insert the key module, wait for program completion and key module ejection, and return the key module to the higher-priced employee. Due to the "insert and forget" feature, the untrained person is not required to interface with the document entry station control panel or press any keys or make and selection decisions. Interfacing with the system requires minimal user time, training, and concentration.

The key module may also function as a portable data base containing electronic documents to be faxed or filed. A user with only a laptop computer looking for a "hook-up" (or anyone without a printer) may electronically transfer files to the document entry system for processing. This paper-free approach is faster than hard copy scanning which requires about three seconds per page.

KEY MODULE DETECTOR (FIGS. 3 and 4)

A key module detector detects the presence of the key module, and for signaling the presence of the key module to the controller. The key module detector may be self-functioning for automatically detecting the presence of the key module, and for automatically signaling the controller after detecting the key module.

The key module detector may be an electrical detector switch 37 (see FIG. 3) having a key module absent position and a key module present position. Key module 34 is inserted into key module reader 35 at port 35P by the user causing the key module detector switch to move from the key module absent position (shown in FIG. 3) to the key module present position. The change in positions signals the presence of the key module to the controller by an INTERRUPT control voltage (+5). Drive hub 35D engages the fully inserted key module and rotates the magnetic disk therein. Read heads 35H read the module data on the key module for transfer to the controller. The key module reader may be responsive to the key module detector or otherwise self-functioning for automatically reading the module data on the key module after the key module detector has detected the key module.

Alternatively, the key module detector may be an optical detector switch 47 formed by a light source 47S and a light sensor 47D. The optical detector switch has a key module absent condition (shown in FIG. 4) and key module present condition. When in the key module absent condition the light source is in optical communication with the light sensor. When in the key module present condition the light source is not in optical communication with the light sensor. The key module is inserted into key module reader 45 at port 45P by the user disrupting the optical communication. The disruption causes the key module detector switch to change from the key module absent condition to the key module present condition, and to signal the presence of the key module to the controller.

METHOD OF OPERATION OF SYSTEM (FIG. 5)

The method of operating the document entry system of FIGS. 1A and 2A is shown in the flow chart of FIG. 5. This method involves receiving user documents containing document data and distributing corresponding electronic document data throughout a user network from a document entry system. The basic steps and sub-steps are presented below.

Providing a portable key module interface containing module data defining distribution parameters and storage parameters for the electronic document data.

Engaging the portable key module interface with the document entry system.

Initiating the operation of the document entry system in response to the module data contained on the key module interface.

Directing of the operation of the document entry system in response to the module data.

Transferring the module data on the portable key module interface to the document entry system to effect the distribution of the electronic document data.

Receiving the user documents containing document data into the document entry system.

Scanning the document data on the user documents to provide corresponding electronic document data for distribution throughout the user network.

Initiating distribution of the electronic document data and distribution parameters and storage parameters therefor, throughout the user network in response to the module data.

Distributing the electronic document data and distribution parameters and storage parameters throughout the user network, in accordance with the distribution parameters defined in the module data.

Storing the electronic document data throughout the user network in accordance with the storage parameters defined in the module data.

Terminating operation of the document entry system in response to the module data.

Disengaging the key module interface from the document entry system in response to the module data.

The apparatus required for carrying out the above method of operation is disclosed hereinbefore in connection with the detailed description of the document entry system (FIG. 1A) and the document entry station (FIG. 2A).

CONCLUSION

It will be apparent to those skilled in the art that the objects of this invention have been achieved as described hereinbefore.

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

We claim as our invention:

1. A document entry system for receiving user documents containing document data and for distributing and storing the document data throughout a user network, comprising:

controller means for controlling the operation of the document entry system;

document scanner means having a document port for receiving the user documents, and responsive to the controller for scanning the document data thereon to provide electronic document data for distribution and storage throughout the user network;

controller display means responsive to the controller for displaying operational information to the user;

portable key module means containing user module data which defines distribution parameters and storage parameters for the electronic document data; and key module reader means having a module port for reading the module data on the key module means and transferring the module data to the controller to effect the distribution and storage of the electronic document data.

2. The document entry system of claim 1, further comprising:

user response means connected to the controller for permitting the user to initiate operation of the document entry system in response to the module data.

3. The document entry system of claim 2, wherein the user response means is a single user key for initiating the transfer of the module data to the controller.

4. The document entry system of claim 2, wherein the user response means is a single user key for initiating the distribution and storage of the electronic document data parameters throughout the user network.

5. The document entry system of claim 1, wherein the module data includes:
   descriptions of the distribution parameters of the document data and descriptions of the storage parameters for the document data; and
   values for the distribution parameters and values for the storage parameters.

6. A document entry station for receiving user documents containing document data and for distributing and storing the document data throughout a user network, comprising:
   controller means responsive to the user for controlling the operation of the document entry station:
   document scanner means having a document port for receiving the user documents, and responsive to the controller for scanning the document data thereon to provide electronic document data for distribution and storage throughout the user network;
   controller display means responsive to the controller for displaying to the user the operational status of the document entry station and operating instructions for the document entry station;
   portable key module means containing user module data having a parameter part which defines distribution parameters and storage parameters for the electronic document data, and having a program part which enables user operation of the document entry station for receiving and scanning the user documents and for distributing and storing the electronic document data;
   key module reader means for reading the module data on the key module means and for transferring the module data to the controller, which module data directs the controller to permit user operation of the document entry station; and
   user response means for permitting the user to make user entries to the controller during user operation of the document entry station.

7. The document entry station of claim 6, further comprising:
   key module detector means for detecting the presence of the key module means, and for signaling the presence of the key module means to the controller.

8. The document entry station of claim 7, wherein the key module detector means is self-functioning for automatically detecting the presence of the key module means, and for automatically signaling the controller after detecting the key module means.

9. The document entry station of claim 8, wherein the key module detector means further comprises:
   an electrical detector switch having a key module absent position and a key module present position; and
   a key module port into which the key module means is inserted by the user causing the key module detector switch to move from the key module absent position to the key module present position, and to signal the presence of the key module means to the controller.

10. The document entry station of claim 8, wherein the key module detector means further comprises:
    an optical detector switch formed by a light source means and a light sensor means;
    the optical detector switch having a key module absent condition in which the light source means is in optical communication with the light sensor means, and having a key module present condition in which the light source means is not in optical communication with the light sensor means; and
    a key module port into which the key module means is inserted by the user disrupting the optical communication causing the key module detector switch to change from the key module absent condition to the key module present condition, and to signal the presence of the key module means to the controller.

11. The document entry station of claim 8, wherein the reader means is responsive to the key module detector means, and is self-functioning for automatically reading the module data on the key module means after the key module detector means has detected the key module means.

12. The document entry station of claim 6, wherein the program part of the module data from the key module means is self-directing for automatically directing the operation of the document entry station after the reader means has transferred the module data to the controller.

13. The document entry station of claim 12, wherein the program part of the module data from the key module means is self-terminating for automatically terminating the self-directed operation of the document entry station.

14. The document entry station of claim 13, wherein the program part of the module data from the key module means is self-ejecting for automatically ejecting the key module means from the key module detector means after termination by the key module means.

15. The document entry station of claim 12, wherein the program part of the module data from the key module means includes user macro programs which simulate user entries for automatically operating the document entry station.

16. The document entry station of claim 15, wherein the module data comprises a file part in addition to the parameter part and the program part, which file part contains user files for distribution and storage throughout the user network.

17. The document entry station of claim 6, wherein the controller display means is an alpha-numeric display for displaying the operational status of the document entry station to the user and for displaying operational instructions from the document entry station to the user.

18. The document entry station of claim 6, wherein the user response means is an alpha-numeric key panel.

19. The document entry station of claim 6, wherein the user response means is touch panel.

20. The document entry station of claim 6, wherein the module data contained in the key module means is stored in a magnetic strip.

21. The document entry station of claim 6, wherein the module data contained in the key module means is stored in an optical memory.

22. The document entry station of claim 6, wherein the module data contained in the key module means is stored in a magnetic disk memory.

23. The document entry station of claim 6, wherein the parameter part of the module data includes user identification data for identifying the user as the reader means reads and transfers the module data to the controller.

24. The document entry station of claim 6, wherein the parameter part of the module data includes a user menu for assisting the user in operation of the document entry station.

25. A method for receiving user documents containing document data and distributing corresponding electronic document data throughout a user network from a document entry system, comprising the steps of:

providing portable key module interface containing module data defining distribution parameters and storage parameters for the electronic document data;

transferring the module data on the portable key module interface to the document entry system to effect the distribution of the electronic document data;

receiving the user documents containing document data;

scanning the document data on the user documents to provide corresponding electronic document data for distribution throughout the user network; and distributing the electronic document data and distribution parameters and storage parameters therefor throughout the user network.

26. The method of claim 25, wherein after the step of distributing the electronic document data, further comprising the additional step of:

storing the electronic document data throughout the user network.

27. The method of claim 25, wherein after the step of providing portable key module interface and before the step of transferring the module data, further comprising the additional step of:

initiating operation of the document entry system in response to the module data.

28. The method of claim 27, wherein after the step of scanning the document data and before the step of distributing the electronic document data, further comprising the additional step of:

initiating the distribution throughout the user network in response to the module data.

29. The method of claim 28, wherein after the step of initiating operation and before the step of transferring module data, further comprising the additional step of:

directing the transferring step and the scanning step and the distribution step of the operation of the document entry system in response to the module data.

30. The method of claim 27, wherein after the step of distributing the electronic document data, further comprising the additional step of:

terminating the operation of the document entry system in response to the module data.

31. The method of claim 25, wherein after the step of providing the portable key module interface and before the step of transferring module data, further comprising the additional step of:

engaging the portable key module interface with the document entry system.

32. The method of claim 31, wherein after the step of distributing the electronic document data, further comprising the additional step of:

disengaging the key module interface from the document entry system in response to the module data.

33. A portable key module device for interfacing with a document entry system, comprising:

memory medium within the portable key module device carrying user module data;

a program part of the user module data for directing the operation of the document entry station from the portable key module device to receive user documents containing document data, to scan the document data to provide corresponding electronic document data, and to distribute the electronic document data throughout a user network;

description parameter part of the user module data containing descriptions of distribution parameters concerning the distribution of the document data, and containing descriptions of storage parameters concerning the storage of the document data after distribution; and value parameter part of the user module data containing values of the distribution parameters for distributing the document data and containing values of the storage parameters for storing the document data after distribution;

for permitting the portable key module device to direct the distribution and storage of the document data.

34. The portable key module device of claim 33, wherein:

the description parameter part of the user module data contains descriptions of user identification data concerning the identification of the user; and the value parameter part of the user module data contains values of the user identification data for identifying the user;

for permitting the program part of the portable key module device to identify the user during the operation of the document entry system.

35. The portable key module device of claim 33, wherein:

the description parameter part of the user module data contains descriptions concerning a user menu; and the value parameter part of the user module data contains values for the user menu;

for permitting the program part of the user module data to present the user menu for assisting the user in operation of the document entry station.

36. The portable key module device of claim 33, further comprising:

a file part of the user module data contains user files for distribution and storage throughout the user network.

37. The portable key module device of claim 33, wherein:

the program part of the user module data terminates the operation of the document entry station after completion of the distribution of the electric document data.

* * * * *